United States Patent [19]

Mikado

[11] 4,178,607
[45] Dec. 11, 1979

[54] PAL COLOR TELEVISION SIGNAL GENERATOR FOR CONTROL OF TIME BASE CORRECTOR

[75] Inventor: Tsuneo Mikado, Tokyo, Japan

[73] Assignee: Nippon Television Industry Corporation, Tokyo, Japan

[21] Appl. No.: 847,536

[22] Filed: Nov. 1, 1977

[30] Foreign Application Priority Data

Nov. 5, 1976 [JP] Japan .................. 51-133528

[51] Int. Cl.² .......................................... H04N 5/795
[52] U.S. Cl. ........................................ 358/8; 360/36; 358/35
[58] Field of Search ............. 358/8, 4, 24, 19, 35; 360/36

[56] References Cited

U.S. PATENT DOCUMENTS

| | | | |
|---|---|---|---|
| 3,932,888 | 1/1976 | Lemke et al. .................. | 360/36 |
| 4,018,990 | 4/1977 | Longet et al. .................. | 358/8 X |
| 4,074,307 | 2/1978 | Dischert et al. ................ | 358/8 |

Primary Examiner—Bernard Konick
Assistant Examiner—Donald McElheney, Jr.
Attorney, Agent, or Firm—Thomas R. Morrison

[57] ABSTRACT

A signal generator includes a delay circuit for delaying a pulse signal synchronized with the horizontal synchronizing signal in video signals according to a PAL color television system, and a counter for counting the pulse signal and controlling the delay time of the delay circuit with its counting output. The frequency of the chrominance subcarrier according to the PAL color television system is not an integral multiple of the frequency of the pulse signal. An output signal synchronized substantially with the chrominance subcarrier or a signal having the frequency which is an integral multiple of the frequency of the chrominance subcarrier, is obtained from the delay circuit. The output signal is used for a reset signal to a counter in a writing portion into a memory of a time base corrector to control the time base of the video signals according to the PAL color television system.

21 Claims, 2 Drawing Figures

PAL COLOR TELEVISION SIGNAL GENERATOR FOR CONTROL OF TIME BASE CORRECTOR

BACKGROUND OF THE INVENTION

1. Field of the Invention

This invention relates to a signal generator, and more particularly to a signal generator which can be most suitably used for a writing portion to a memory in a time base corrector in a PAL color television system.

2. Description of the Prior Art

FIG. 1 shows a conventional writing portion to a memory in a time base corrector. In FIG. 1, video signals are supplied to an AD converter 1, and converted thereby to digital signals. The converted video signals are memorized in a memory 2. In this case, the memory 2 may be of the type of RAM (Random Access Memory).

In order to obtain a writing address signal for the memory 2, a burst signal is supplied to a locked oscillator 3. A signal S synchronized with the burst signal, whose frequency is fc, is obtained from the locked oscillator 3, and applied to a counter 4 to be counted by the latter. The writing address signal is obtained from the counter 4. The output signal S from the locked oscillator 3 is further supplied as a clock pulse to the AD converter 1.

In the read-out of the video signals memorized in the memory 2, a reading address signal is supplied to the memory 2 from a not-shown circuit. The time base of the video signals is corrected with the adjustment of the time relationship between the writing address signal and the reading address signal.

In the time base corrector of FIG. 1, pulse signals H synchronized with horizontal synchronizing signals are supplied as reset signals to the counter 4. Accordingly, when the time base corrector of FIG. 1 is used for a PAL color television system, it has the following disadvantage:

According to the PAL color television system, there is the following relationship between the frequency fc of the subcarrier (fc=4.43361875 MHz) and the frequency $f_H$ of the horizontal synchronizing signal ($f_H$=15.625 KHz):

$$fc = (284 - \tfrac{1}{4})f_H + 25 \text{ Hz} \tag{1}$$

Accordingly, the address signal obtained by resetting the counter 4 with the pulse signal H synchronized with the horizontal synchronizing signal progresses or leads in phase by about $\pi/2$ with respect to the output signal S of the locked oscillator 3 every period of the horizontal scanning line. When the video signals written into the memory 2 with the thus obtained address signals are read out from the memory 2 with address signals obtained by dividing a fixed frequency, the video signals are distorted. For example, when video signals for a vertical line as a picture are written into the memory 2, the read-out video signals are distorted into video signals for zigzag configuration.

SUMMARY OF THE INVENTION

An object of this invention is to provide a signal generator in which a third signal synchronized with one of first and second signals having different frequencies can be obtained in simple circuit construction under the control of the other of the first and second signals, the frequencies of the first and second signals being not integrally related to each other.

Another object of this invention is to provide a signal generator which can form a signal to compensate periodical phase shifts between a pulse signal synchronized with a horizontal synchronizing signal, and a chrominance subcarrier, in a PAL color television system in which the frequency of the chrominance subcarrier is not an integral multiple of the frequency of the horizontal synchronizing signal.

A further object of this invention is to provide a video signal memory apparatus which can memorize video signals without influence of the fact that the frequency of the chrominance subcarrier is not an integral multiple of the frequency of the pulse signal synchronized with the horizontal synchronizing signal.

In accordance with one aspect of this invention, a signal generator comprises: a delay circuit for delaying a first signal, the delay time of the delay circuit being controllable; and a counter for counting the first signal, the delay time of the delay circuit being controlled in accordance with the counting output of the counter, whereby a third signal substantially synchronized with a second signal is obtained from the delay circuit, the frequency of the second signal being not an integral multiple of the frequency of the first signal.

The above and other objects, features and advantages of this invention, will be apparent in the following detailed description of illustrative embodiments which are to be read in connection with the accompanying drawings.

DESCRIPTION OF THE PREFERRED EMBODIMENTS

Figure 1:
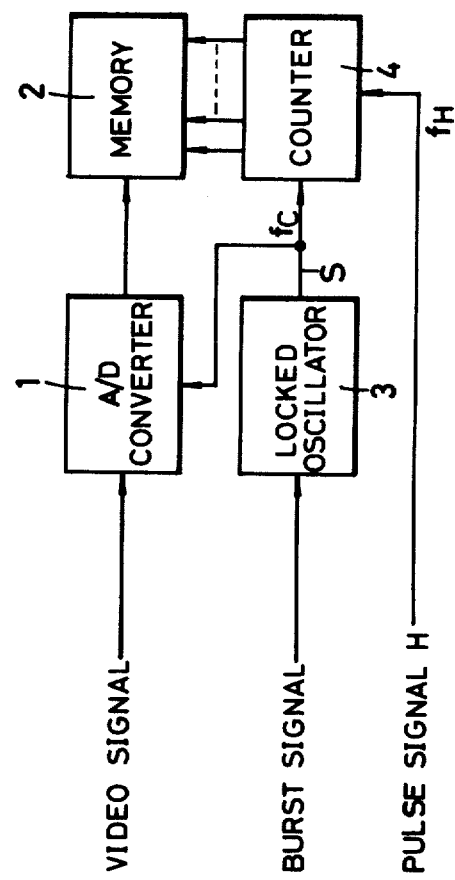
FIG. 1 is a block diagram of a writing portion to a memory of a conventional time base corrector.

One embodiment of this invention will be described with reference to FIG. 2. Parts in FIG. 2 which correspond to the parts in FIG. 1, are denoted by the same reference numerals and will not be described.

Figure 2:
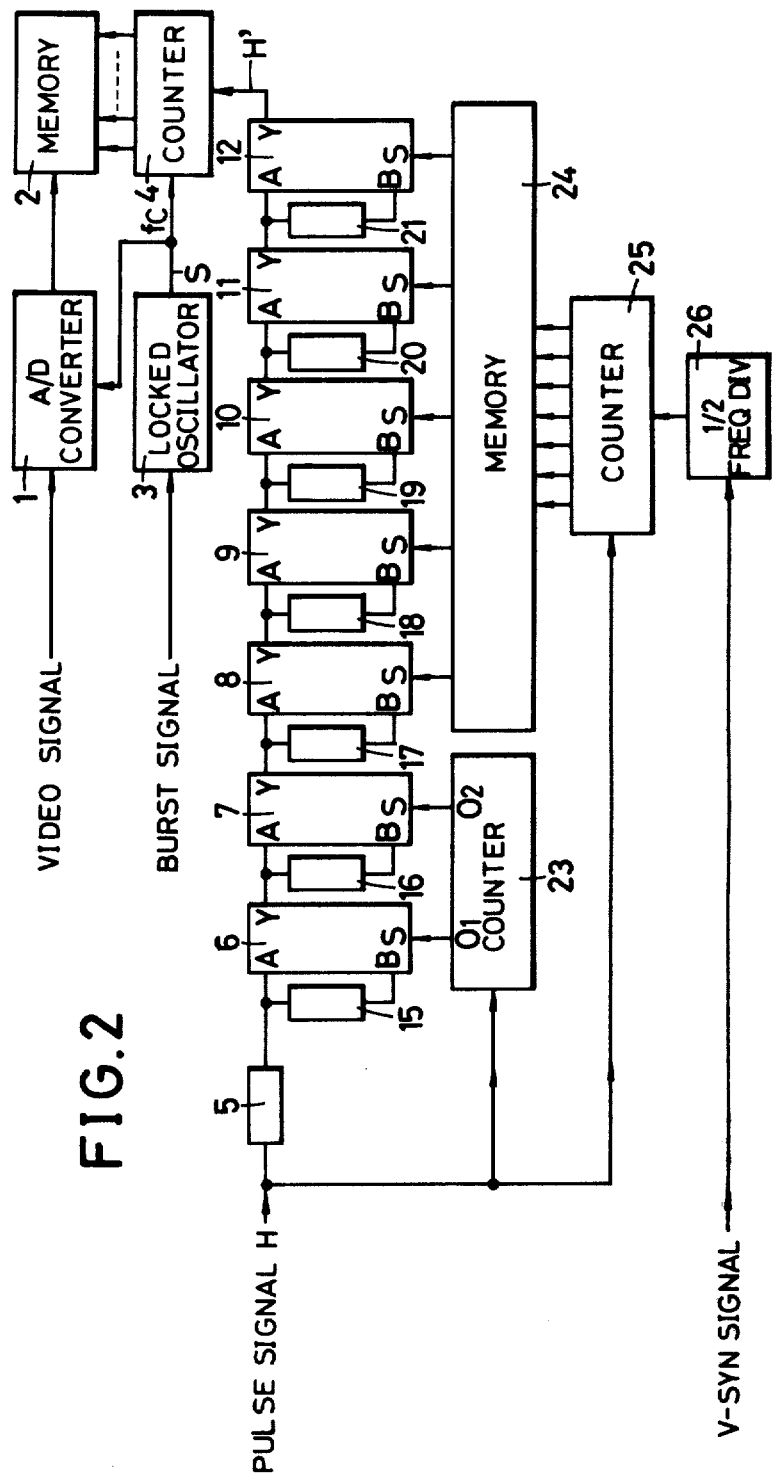
FIG. 2 is a block diagram of a writing portion to a memory of a time base corrector according to one embodiment of this invention.

Referring to FIG. 2, a pulse signal H synchronized with the horizontal synchronizing signals is supplied through a delay line 5 having a fixed delay time to a line selector 6 and to a delay line 15. The delay line 5 functions to delay the pulse signal H in consideration of change-over operation times of counters 23 and 25, and a memory 24 which will be described hereinafter. For example, the delay time of the delay line 5 is $1\mu$ sec.

Next, delay lines 15 to 21 will be described. When the period (1/fc) of the subcarrier signal S obtained from the locked oscillator 3 is represented by $T_c$, the delay lines 15 and 16 have delay times $T_c/2$ and $T_c/4$, respectively. And delay lines 17 to 21 have delay times $T_c/2$, $T_c/4$, $T_c/8$, $T_c/16$ and $T_c/32$, respectively. In line selectors 6 to 12, terminals Y are selectively connected to terminals A and B in response to signals applied to terminals S, respectively. The delay lines 15 to 21 are connected between the terminals A and B of the line selectors 6 to 12, respectively.

The line selectors 6 and 7 are controlled by the outputs of the counter 23. An output signal obtained by dividing the frequency of the pulse signal H synchronized with the horizontal synchronizing signal into $\tfrac{1}{4}$ of the frequency of the pulse signal H, is generated from one output terminal $O_1$ of the counter 23. And another output signal obtained by dividing the frequency of the pulse signal H synchronized with the horizontal synchronizing signal into ½ of the frequency of the pulse signal H, is generated from another output terminal $O_2$ of the counter 23. The output signals from the output terminals $O_1$ and $O_2$ of the counter 23 are supplied to the terminals S of the line selectors 7 and 6.

The line selectors 8 to 12 are controlled by the output signals of the memory 24. The memory 24 may be of the type of ROM (Read Only Memory). Informations for deciding delay times necessary for every horizontal scanning lines are memorized in the memory 24. Address signals from the counter 25 are supplied to the memory 24. The counter 25 functions to divide the frequency of the pulse signal H, and it may be of the 625-counting type in accordance with the number of the horizontal scanning lines. Vertical synchronizing signals are supplied to a ½ frequency divider 26. The frequency of the vertical synchronizing signals is divided into ½ frequency. The output of the ½ frequency divider 26 is supplied as a reset signal for every frame to the counter 25.

Next, operation of the circuit of FIG. 2 will be described.

Since the frequency $f_H$ is equal to 15.625 KHz, the equation (1) can be modified into the following equation:

$$fc = (284 - \underbrace{\frac{1}{4}}_{A\text{-term}} + \underbrace{\frac{1}{625}}_{B\text{-term}})f_H \quad (2)$$

The equation (2) means that a signal H' having the frequency $f_H$, which is 1/n (n: integer) times as high as the frequency fc of the subcarrier signal S, and can be obtained by compensating the A-term and B-term in the above equation (2), synchronizes with the subcarrier signal S. When the counter 4 is reset with the signal H', the phase of the output of the counter 4 does not vary with respect to the subcarrier signal S for every horizontal scanning line, but it is always constant with respect to the subcarrier signal S.

In the embodiment of this invention, the above-described A-term and B-term are compensated by means of the delay lines to obtain the signal H'.

Next, the compensation operation of the delay lines will be described with reference to Table I. The equation (2) is further modified into the following equation (3) for explanation of the Table I:

$$T_H = (284 - \frac{1}{4} + \frac{1}{625})T_c \quad (3)$$

where $T_c$ and $T_H$ equal to $1/f_c$ and $1/f_H$, respectively.

In the Table I, the column (A) represents delay times theoretically necessary for compensation of the A-term in the equation (2), the column (B) represents actual delay times obtained by the delay line 15 or 16 or the combination of the delay lines 15 and 16, the column (C) represents delay times theoretically necessary for compensation of the B-term in the equation (2), and the column (D) represents actual delay times obtained by the delay line 17, 18 ... or 21, or the combinations of the delay lines 17 to 21.

TABLE 1

| | (A) | (B) | (C) | (D) |
|---|---|---|---|---|
| $t_0$ | 0 | 0 | 0 | 0 |
| $t_1$ | $+\frac{1}{4}T_c$ | $-\frac{3}{4}T_c$ | $-\frac{1}{625}T_c$ | 0 |
| $t_2$ | $+\frac{1}{2}T_c$ | $-\frac{1}{2}T_c$ | $-\frac{2}{625}T_c$ | 0 |
| $t_3$ | $+\frac{3}{4}T_c$ | $-\frac{1}{4}T_c$ | $-\frac{3}{625}T_c$ | 0 |
| $t_4$ | $+\frac{4}{4}T_c$ | 0 | $-\frac{4}{625}T_c$ | 0 |
| $t_5$ | $+\frac{5}{4}T_c$ | $-\frac{3}{4}T_c$ | $-\frac{5}{625}T_c$ | 0 |
| . | . | . | . | . |
| . | . | . | . | . |
| . | . | . | . | . |
| $t_9$ | $+\frac{9}{4}T_c$ | $-\frac{3}{4}T_c$ | $-\frac{9}{625}T_c$ | 0 |
| $t_{10}$ | $+\frac{10}{4}T_c$ | $-\frac{1}{2}T_c$ | $-\frac{10}{625}T_c$ | $-\frac{1}{32}T_c$ |
| $t_{11}$ | $+\frac{11}{4}T_c$ | $-\frac{1}{4}T_c$ | $-\frac{11}{625}T_c$ | $-\frac{1}{32}T_c$ |
| . | . | . | . | . |
| . | . | . | . | . |
| . | . | . | . | . |
| $t_{29}$ | $+\frac{29}{4}T_c$ | $-\frac{3}{4}T_c$ | $-\frac{29}{625}T_c$ | $-\frac{1}{32}T_c$ |
| $t_{30}$ | $+\frac{30}{4}T_c$ | $-\frac{1}{2}T_c$ | $-\frac{30}{625}T_c$ | $-\frac{1}{16}T_c$ |
| $t_{31}$ | $+\frac{31}{4}T_c$ | $-\frac{1}{4}T_c$ | $-\frac{31}{625}T_c$ | $-\frac{1}{16}T_c$ |
| . | . | . | . | . |
| . | . | . | . | . |
| . | . | . | . | . |
| $t_{625}$ | $+\frac{625}{4}T_c$ | $-\frac{3}{4}T_c$ | $-\frac{625}{625}T_c$ | 0 |

+ lead in phase
− lag in phase

Phases of the subcarrier signal S and pulse signal H synchronized with the horizontal synchronizing signal, at time $t_0$, will be represented by $\Theta_s$ and $\Theta_H$ respectively. In order that the phases of the subcarrier signal S and pulse signal H at time $t_1$, namely in period of one horizontal scanning line after the time $t_0$, are the same as the phases $\Theta_s$ and $\Theta_H$ at the time $t_0$, it is required that the phase of the signal H is made to lead by $T_c/4$ relative to the phase of the signal S with respect to the A-term in the equation (1) or (2), and it is made to lag by $T_c/625$ relative to the phase of the signal S with respect to the B-term in the equation (1) or (2). From the viewpoint of the compensation of the A-term, the lead of the phase of the signal H by $T_c/4$ is equal to the lag of the phase of the signal H by ¾ T_c. In the circuit of FIG. 2, the signal H is delayed by ¾ T_c by passing through the delay lines 15 and 16. With respect to the B-term, it is theoretically required that the phase of the signal H is delayed by T_c/625. However, since the required delay time T_c/625 of the signal H is negligible short, it may be considered to be approximately zero. Namely, the frequency fc may be considered to be approximately equal to 284 f_H (fc ≈ 284f_H').

Similarly, the delay times of the signal H with respect to the A-term and the B-term are obtained for times $t_2$, $t_3$, ... $t_{625}$, as shown in the Table I. The line selectors 6 to 12 are so controlled with the counters 23 and 25, and the memory 24 that the delay times shown in the Table I are obtained for times $t_1, t_2, t_3 \ldots t_{625}$.

Thus, with the compensations of the A-term and B-term, the signal H' having the frequency $f_H$, which is apparently 1/n times as high as the frequency fc of the subcarrier, is obtained from the terminal Y of the line selector 12. The signal H' synchronizes substantially with the subcarrier signal S.

The signal H' is supplied as the reset signal to the counter 4 which counts the subcarrier signal S to form the address signal. The counting outputs of the counter 4 which is reset with the signal H', varies every four horizontal scanning lines, as (284, 284, 284, 283), (284, 284, 284, 283) . . . . The counting outputs (284, 284, 284, 284) are obtained once per four frames from the counter 4.

Although there has been described one embodiment of this invention, various modifications are possible on the basis of the spirit of this invention.

For example, the line selectors 6 and 7 are controlled with the output of the counter 23 in the above embodiment. However, they may be controlled with the output of the memory 24 instead of the output of the counter 23, in the same manner as the line selectors 8 to 12.

Moreover, the output of the memory 24 is used as the control signal for the line selectors 8 to 12 in the above embodiment. However, the output of the combination of an arithmetic circuit and a counter, or the output of the counter itself may be used as the control signal for the line selectors 8 to 12.

Clock pulses having the frequency $nf_c$ which is integrally related to the frequency of the subcarrier signals S as the output of the locked oscillator 3 may be supplied to the counter 4. In this case, a D-type flip-flop is connected between the counter 4 and the last line selector 12. The subcarrier S having the frequency fc is applied to the T-terminal of the D-type flip-flop, and the signal H' from the last line selector 12 is applied to the D-terminal of the D-type flip-flop. The output signal from the Q-terminal of the D-type flip-flop is supplied as the reset signal to the counter 4. Thus, the signal H' passing through the D-type flip-flop, as the output signal of the latter, can be more surely synchronized with the signal having the frequency $nf_c$.

Instead of the D-type flip-flop, a synchronous counter may be connected between the last line selector and the counter 4.

What is claimed is:

1. A video signal processing apparatus comprising:
   (a) an AD converter for converting the analog value of video signals into the digital value;
   (b) a memory for memorizing the output of said AD converter;
   (c) a locked oscillator for generating clock pulses locked with burst signal in said video signals;
   (d) a first counter for counting said clock pulses to form an address signal for said memory;
   (e) a delay circuit for delaying a pulse signal synchronized with the horizontal synchronizing signal in said video signals, the delay time of said delay circuit being controllable; and
   (f) a second counter for counting said pulse signal synchronized with the horizontal synchronizing signal, and controlling the delay time of said delay circuit with the counting output of said second counter; whereby an output signal having the frequency which is substantially 1/n (n: integer) times as high as the frequency of said clock pulses being not integrally related to the frequency of said pulse signal synchronized with the horizontal synchronizing signal is obtained from said delay circuit, and said first counter is reset with the output signal of said delay circuit to generate said address signal synchronized substantially with said pulse signal.

2. A video signal processing apparatus according to claim 1, in which said clock pulses are a chrominance subcarrier or a signal having the frequency which is an integral multiple of the frequency of said chrominance subcarrier.

3. A video signal processing apparatus according to claim 2, in which said video signals are video signals according to a PAL color television system, and the relationship between the frequencies of said pulse signal and said chrominance subcarrier is represented by:

$$f_c = (284 - \tfrac{1}{4})f_H + 25 \text{ Hz},$$

where $f_H$ and $f_c$ represent the frequencies of said pulse signal and said chrominance subcarrier, respectively.

4. A video signal processing apparatus according to claim 1, in which said delay circuit consists of plural delay circuit members having different delay times, and said plural delay circuit members are divided into a first group for forming the delay time to compensate phase shifts due to the second term in the brackets of the following equation, and a second group for forming the delay time to compensate phase shifts due to the third term in the brackets of said following equation:

$$T_H = (284 - \tfrac{1}{4} + \tfrac{1}{625})T_c,$$

where $T_H = 1/f_H$, and $T_c = 1/f_c$.

5. A video signal processing apparatus according to claim 4, in which the delay circuit members of said first and second groups comprise delay lines and selector circuits for selecting the combinations of said delay lines.

6. A video signal processing apparatus according to claim 5, in which said second counter consists of a 4-counting type counter for counting said pulse signal synchronized with the horizontal synchronizing signal, and a 625-counting type counter, and said signal generator further includes a memory to which the output of said 625-counting-type counter is supplied as an address signal, and in which informations for changing over the combinations of said delay lines in order are memorized, the first selector circuit for selecting the combinations of said delay lines of the first group being controlled with the output of said 4-counting-type counter, and the second selector circuit for selecting the combinations of said delay lines of the second group being controlled with the output of said memory, whereby the combinations of said plural delay lines are changed over in order to compensate periodcal phase shifts between said pulse signal synchronized with the horizontal synchronizing signal and said clock pulses, and said output signal having the frequency which is substantially 1/n (n: integer) times as high as the frequency of said clock pulses is obtained from said delay circuit.

7. A video signal processing apparatus according to claim 6 further comprising means for resetting said 625-counting counter once per frame.

8. A video signal processing apparatus according to claim 7 wherein said means for resetting comprises a divide by 2 counter, a vertical synchronizing signal being connected to one input of said divide by 2 counter and the output of said divide by 2 counter being connected to the reset input of said 625-counting counter.

9. A video signal processing apparatus comprising:
(a) a video signal processing circuit for processing video signal on the basis of predetermined clock pulses;
(b) a timing signal generating circuit including:
 (i) a delay circuit for delaying a pulse signal synchronized with a horizontal synchronizing signal in said video signal, the delay time of said delay circuit being controllable; and
 (ii) a counter for counting said pulse signal synchronized with the horizontal synchronizing signal, the delay time of said delay circuit being changed at every horizontal period in a predetermined periodical sequence in accordance with the counting output of said counter; whereby a timing signal is obtained from said delay circuit having a frequency which is substantially 1/n (n: integer) times as high as the frequency of said clock pulses and is not integrally related to the frequency of said pulse signal synchronized with the horizontal synchronizing signal, and said video signal processing circuit is provided with said timing signal to process the video signal at every corrected horizontal period corresponding to said frequency of 1/n times as high as the frequency of said clock pulses.

10. A video signal processing apparatus according to claim 9, in which said delay circuit consists of first and second delay circuits connected in series with each other, and said counter consists of first and second counters, said timing signal generating circuit further includes a memory to which the output of said second counter is supplied as an address signal and in which informations for controlling the delay time of said second delay circuit are memorized, the delay time of said first delay circuit being controlled in accordance with the output of said first counter, and the delay time of said second delay circuit being controlled in accordance with the output of said memory.

11. A video signal processing apparatus according to claim 9, in which said video signal processing circuit includes:
(a) an AD converter for converting the analog value of said video signal into the digital value;
(b) a memory for memorizing the output of said AD converter;
(c) a locked oscillator for generating said clock pulses locked with burst signal in said video signal; and
(d) an address counter for counting said clock pulses to form an address signal for said memory, said address counter being reset with the timing signal obtained from said delay circuit to generate said address signal synchronized substantially with said pulse signal.

12. A video signal processing apparatus according to claim 9, in which said clock pulses are a chrominance subcarrier or a signal having the frequency which is an integral as high as the multiple of the frequency of said chrominance subcarrier.

13. A video signal processing apparatus according to claim 12, in which said video signal is video signal according to a PAL color television system, and the relationship between the frequencies of said pulse signal and said chrominance subcarrier is represented by:

$$f_c = (284 - \tfrac{1}{4})f_H + 25 \text{ Hz},$$

where $f_H$ and $f_c$ represent the frequencies of said pulse signal and said chrominance subcarrier, respectively.

14. A video signal processing apparatus according to claim 13, in which said delay circuit includes plural delay lines having different delay times, and a selector circuit for selecting the combinations of said delay lines, said selector circuit is operated in accordance with the counting output of said counter to change over the combinations of said delay lines in order for compensation of periodical phase shifts between said pulse signal and said chrominance subcarrier, and said timing signal is obtained from said delay circuit.

15. A video signal processing apparatus according to claim 14, in which said timing signal generating circuit further includes a memory to which the counting output of said counter is supplied as an address signal and in which informations for changing the delay time of said delay circuit are memorized, said informations being read out from said memory in accordance with the counting output of said counter to change the delay time of said delay circuit.

16. A video signal processing apparatus according to claim 14, in which said timing signal generating circuit further includes a memory to which the counting output of said counter is supplied as an address signal, in which informations for changing over the combinations of said delay lines in order are read out from said memory in accordance with the counting output of said counter to operate said selector circuit.

17. A video signal processing apparatus according to claim 13, in which said delay circuit includes a first delay circuit group for forming the delay time to compensate phase shifts due to the second term in the brackets of the following equation modified from equation (1), and a second delay circuit group for forming the delay time to compensate phase shifts due to third term in the brackets of said following equation, and with the compensations by said first and second delay circuit groups, said timing signal having the frequency which is substantially 1/n (n: integer) times as high as the frequency of said clock pulse signal is obtained from said delay circuit:

$$T_H = (284 - \tfrac{1}{4} + \tfrac{1}{625})T_c \qquad (2),$$

where $T_H = 1/f_H$ and $T_c = 1/f_c$.

18. A video signal processing apparatus according to claim 17, in which said first and second delay circuit groups include plural delay lines and selector circuits, the first selector circuit for selecting the combinations of the delay lines of said first delay circuit group is controlled with the output of said first counter for counting said pulse signal, and the second selector circuit for selecting the combinations of the delay lines of said second delay circuit group is controlled with the output of said memory to which the output of said second counter for counting said pulse signal is supplied as an address signal, and in which informations for changing over the combinations of said delay lines in order are memorized.

19. A video signal processing apparatus according to claim 18, in which said first counter is of the 4-counting type, and said second counter is of the 625-counting type.

20. A video signal processing apparatus according to claim 19, further comprising means for resetting said 625-counting counter once per frame.

21. A video signal processing apparatus according to claim 20, wherein said means for resetting comprises a divide by 2 counter, a vertical synchronizing signal being connected to one input of said divide by 2 counter and the output of said divide by 2 counter being connected to the reset input of said 625-counting counter.

* * * * *